(12) United States Patent
Creamer et al.

(10) Patent No.: US 8,019,607 B2
(45) Date of Patent: *Sep. 13, 2011

(54) ESTABLISHING CALL-BASED AUDIO SOCKETS WITHIN A COMPONENTIZED VOICE SERVER

(75) Inventors: Thomas E. Creamer, Boca Raton, FL (US); Victor S. Moore, Boynton Beach, FL (US); Wendi L. Nusbickel, Boca Raton, FL (US); Ricardo Dos Santos, Boca Raton, FL (US); James J. Sliwa, Raleigh, NC (US)

(73) Assignee: Nuance Communications, Inc., Burlington, MA (US)

( * ) Notice: Subject to any disclaimer, the term of this patent is extended or adjusted under 35 U.S.C. 154(b) by 501 days.

This patent is subject to a terminal disclaimer.

(21) Appl. No.: 12/183,639

(22) Filed: Jul. 31, 2008

(65) Prior Publication Data

US 2009/0055191 A1 Feb. 26, 2009

Related U.S. Application Data

(63) Continuation of application No. 10/833,516, filed on Apr. 28, 2004, now Pat. No. 7,424,432.

(51) Int. Cl.
*G10L 21/00* (2006.01)
(52) U.S. Cl. .................... 704/270.1; 379/88.14
(58) Field of Classification Search ............... 704/270.1; 379/88.14
See application file for complete search history.

(56) References Cited

U.S. PATENT DOCUMENTS

| 6,125,175 | A | 9/2000 | Goldberg et al. |
| 6,330,306 | B1 | 12/2001 | Brown |
| 6,370,254 | B1 | 4/2002 | Gore et al. |
| 6,574,595 | B1 | 6/2003 | Mitchell et al. |
| 6,801,604 | B2 | 10/2004 | Maes et al. |
| 6,947,895 | B1 | 9/2005 | Shanmugham |
| 7,103,156 | B2 | 9/2006 | Celi et al. |
| 7,184,534 | B2 | 2/2007 | Birch et al. |
| 7,212,623 | B2 | 5/2007 | Creamer et |
| 7,424,432 | B2 * | 9/2008 | Creamer et al. ......... 704/270.1 |
| 7,925,510 | B2 * | 4/2011 | Creamer et al. ......... 704/270.1 |
| 2001/0043684 | A1 | 11/2001 | Guedalia et al. |
| 2002/0103554 | A1 | 8/2002 | Coles et al. |
| 2002/0173333 | A1 | 11/2002 | Buchholz et al. |
| 2002/0184373 | A1 | 12/2002 | Maes |
| 2004/0230434 | A1 | 11/2004 | Galanes et al. |
| 2005/0246173 | A1 | 11/2005 | Creamer et al. |
| 2005/0261907 | A1 | 11/2005 | Smolenski et al. |

* cited by examiner

*Primary Examiner* — Susan McFadden
(74) *Attorney, Agent, or Firm* — Wolf, Greenfield & Sacks, P.C.

(57) ABSTRACT

A method of interfacing a telephone application server and a speech engine can include the step of establishing one or more audio sockets in a media converting component of the telephone application server. The audio socket can remain available for approximately a duration of a call. A work unit that requires processing by a speech engine can be detected for the call. An identifier for the audio socket and a data for the work unit can be conveyed to a selected speech engine. Work unit results from the selected speech engine can be received by the media converting component via the previously established audio socket.

13 Claims, 2 Drawing Sheets

ESTABLISHING CALL-BASED AUDIO SOCKETS WITHIN A COMPONENTIZED VOICE SERVER

CROSS REFERENCE TO RELATED APPLICATIONS

This application is a continuation of, and accordingly claims the benefit from, U.S. patent application Ser. No. 10/833,516, now issued U.S. Pat. No. 7,424,432, which was filed in the U.S. Patent and Trademark Office on Apr. 28, 2004.

BACKGROUND

1. Field of the Invention

The present invention relates to the field of telecommunications and, more particularly, to a telecommunications voice server that establishes call-based audio sockets.

2. Description of the Related Art

The Websphere Application Server (WAS) by International Business Machines, Corporation (IBM) of Armonk, N.Y. can be utilized by a telecommunications voice server. When so utilized, WAS can handle a multitude of telephony related tasks, a few of which can require services of external speech engines. The speech engines can perform speech-to-text conversions, text-to-speech conversions, and other automated speech related functions for the WAS.

Many speech engines, such as the IBM automatic speech recognition (ASR) engine, can use customizable dynamic link libraries (DLLs) to define different audio sources. The use of customizable DLLs permits the speech engines to modularly handle a breadth of different audio sources, different audio formats, and different audio codecs. Using the DLLs, the speech engines can act as audio socket servers, dynamically establishing ports for exchanging information with external components. Further, the speech engines can include application program interfaces (APIs) for facilitating information exchanges. For example, the IBM ASR engine includes an API called the Speech Manager API (SMAPI), which can be used by the WAS to communicate with the IBM ASR. More specifically, a telephony and media (T&M) subsystem of the WAS can interface with the IBM ASR via SMAPI, where the T&M subsystem is generally responsible for performing media conversions between the WAS and a telephony gateway, between the WAS and speech engines, and/or between the speech engines and the telephony gateway.

In operation, a telephony call can be received that requires WAS operations. In response to call establishment, the WAS can be initialized. Initialization includes activating the T&M subsystem to detect audio utterances occurring within the established call. When an utterance is detected, the T&M subsystem can briefly cache the utterance as the WAS determines appropriate actions to perform. One possible action involves speech-to-text converting the utterance. To perform this conversion, the WAS assigns a speech engine to handle the utterance. The speech engine dynamically establishes an audio socket. An identifier for the audio socket is conveyed through the WAS to the T&M subsystem. Upon receiving the identifier, the T&M subsystem conveys the utterance to the selected speech engine via the established audio socket. Once the utterance has been processed by the speech engine, the connection between the T&M subsystem is terminated and the audio socket is closed and/or reallocated for other processing tasks.

It should be appreciated that the WAS, like most high volume servers, performs turn based speech engine allocations as opposed to call based allocations. Turn based allocation techniques dynamically assign discrete work units or turns to speech engines as needed. Call based allocation techniques provide a 1-1 speech engine to telephone call mapping. As speech engines are typically costly and consume extensive computing resources, cost effective telephony solutions do not generally perform call-based allocation, but rather perform turn-based allocation of speech engines, thereby maximizing the usage of expensive speech engine components.

The aforementioned approach for utilizing speech engines, however, can be problematic. One such problem is that numerous turns for processing different utterances are commonly performed during each telephone call. For each turn, the T&M subsystem conveys audio signals to a particular speech engine via a specified audio socket. Accordingly, throughout the call, the T&M subsystem handles continuously changing audio ports that are dynamically allocated by the various speech engines. Moreover, each time a speech engine allocates an audio socket, the host/port/protocol for the audio socket established by the speech engine must be conveyed to the T&M subsystem before audio signals can be conveyed between the T&M subsystem and the speech engine.

Conveying the audio socket information from the speech engine to the T&M subsystem can result in processing delays. These delays can be pronounced when the voice server through which the socket information is conveyed has a componentized and functionally isolated architecture, as does the WAS. Appreciably, such an architecture does not constantly maintain a call-based control path between the T&M subsystem and the speech engine. A skilled artesian can recognize that this approach is subject to numerous bottlenecks which can be problematic when the voice server, T&M subsystem, and/or the speech engines are placed under significant loads. Consequently, it would be highly advantageous to utilize a different approach that reduces latencies resulting from these bottlenecks.

SUMMARY OF THE INVENTION

The present invention includes a method, a system, and an apparatus for establishing call-based audio sockets within a componentized voice server in accordance with the inventive arrangements disclosed herein. More specifically, a media converting component of a voice server, such as the telephony and media (T&M) subsystem of a Websphere application server (WAS), can function as an audio socket server. When a call is initialized, one or more audio sockets can be established by the media converting component for approximately the duration of the call. An identifier for the established sockets can be conveyed to other components of the voice server along with additional call specific information. When the voice server requires services of a remote speech server, the identifier for the previously established audio socket can be conveyed to the selected speech engine along with other data necessary for performing the desired service. The speech engine can establish a communication link with the media converting component via the identified socket. Data can be conveyed between the media converting component and the speech engine as appropriate. Once the speech engine has completed its assigned tasks, the connection with the socket can be terminated, yet the audio socket can remain open for other communications with other speech engines for the duration of the call.

One aspect of the present invention includes a method of interfacing a telephone application server and a speech engine. The method can include the step of establishing one or more audio sockets in a media converting component of the telephone application server. The audio socket can remain available for approximately a duration of a call. A work unit that requires processing by a speech engine can be detected for the call. An identifier for the audio socket and a data for the work unit can be conveyed to a selected speech engine. Work unit results from the selected speech engine can be received by the media converting component via the previously established audio socket.

It should be notated that the invention can be implemented as a program for controlling a computer to implement the functions described herein, or a program for enabling a computer to perform the process corresponding to the steps disclosed herein. This program may be provided by storing the program in a magnetic disk, an optical disk, a semiconductor memory, any other recording medium, or distributed via a network.

Another aspect of the present invention includes a system for providing speech services that includes a telephone application server, at least one speech engine, and a telephone gateway. The telephone application server can have a componentized architecture of different modular components. One of these modular components can include a media converting component that can function as an audio socket server. The speech engine can communicate to the telephone gateway using the media converting component as an intermediary. The speech engine can connect to the telephone gateway via sockets established by the speech engine, where the established sockets can be associated with selected telephone calls. The sockets can remain available for approximately the duration of the associated telephone call.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

Figure 1:
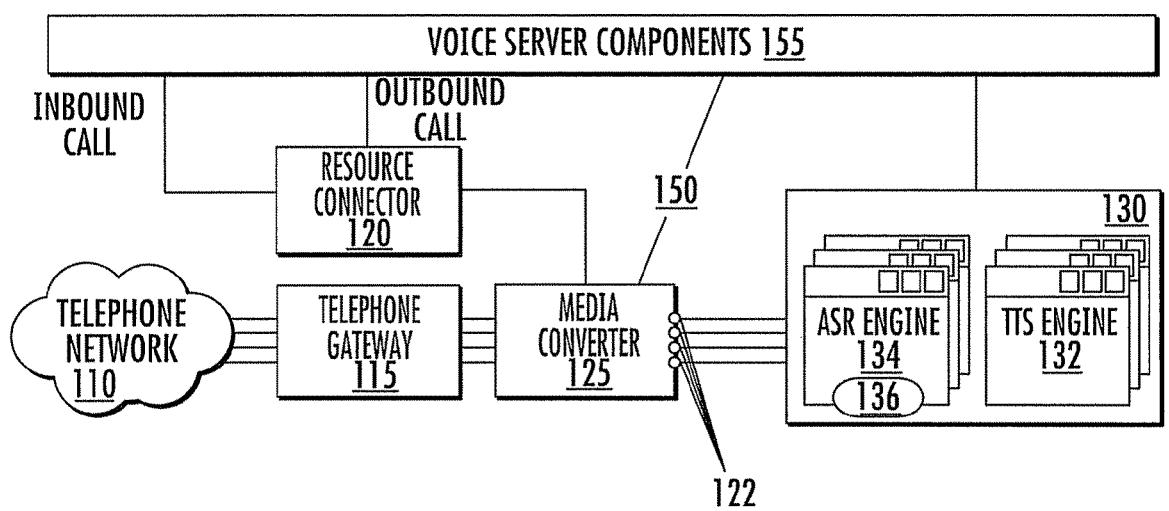
FIG. 1 is a schematic diagram illustrating a system that includes a voice server that provides speech services in accordance with the inventive arrangements disclosed herein.

FIG. 1 is a schematic diagram illustrating a system 100 that provides speech services in accordance with the inventive arrangements disclosed herein. The system 100 can include a telephone gateway 115, a componentized voice server 150, and a multitude of speech engines 130. The telephone gateway 115 can include hardware or software that translates protocols and/or routes calls between a telephone network 110, such as a Public Switched Telephone Network (PSTN), and the voice server components 150. For example, the telephone gateway 115 can include a Cisco 2600 series router from Cisco Systems, Inc. of San Jose, Calif., a Cisco, a Cisco 5300 series gateway, a Digital Trunk extended Adapter (DTXA), a Intel (R) Dialogic (R) Adaptor from Intel Corporation of Santa Clara, Calif., and the like.

The speech engines 130 can include one or more automatic speech recognition engines 134, one or more text to speech engines 132, and other speech related engines and/or services. Particular ones of the speech engines 130 can include one or more application program interfaces (APIs) 136 for facilitating communications between the speech engine 130 and external components. For example, in one embodiment, the ASR engine 134 can include an IBM ASR engine with an API such as a Speech Manager API (SMAPI).

The voice server 150 can have a componentized and isolated architecture that can include voice server components 155 and a media converter component 125. The voice server components 155 can include a telephone server, a dialogue server, a speech server, one or more web servers, and other such components. Selective ones of the voice server components 155 can be implemented as Virtual Machines, such as virtual machines adhering to the JAVA 2 Enterprise Edition (J2EE) specification. In one embodiment, the voice sever 150 can be implemented using the Websphere Application Server (WAS), where the WAS is a particular implementation of J2EE. In another embodiment, a call descriptor object (CDO) can be used to convey call data between the voice server components 155. For example, the CDO can specify the gateway identifiers, audio socket identifiers, telephone identification data, and/or the like.

The media converter 125 can perform media conversions between the telephone gateway 115 and the speech engines 130, between the voice server components 155 and the telephone gateway 115, and between the voice server components 155 and the speech engine 130. In one embodiment, the media converter 125 can be a centralized interfacing subsystem of the voice server 150 for inputting and outputting data to and from the voice server 155. For example, the media converter 125 can include a T&M subsystem, such as the T&M subsystem of a WAS.

The media converter 125 can establish a plurality of media ports 122, thereby functioning as an audio socket server. Each of the media ports 122 can be used to establish a communication link with a speech engine 130. Moreover, each of the media ports 122 can be associated with a telephone call. When a call is initialized, one or more media ports 122 can be established. The media ports 122 can remain active and available for approximately the duration of the call. Multiple different speech engines 130 that process different turns for a call can use the same media port 122 to relay information to and from the media converter 125.

The system 100 can also include a resource connector 120. The resource connector 120 can be a communication intermediary between the telephone gateway 115 and the voice server components 155 and/or media converter 125. The resource connector 120 can manage resource allocations for calls.

In operation, a user can initiate a telephone call. The call can be conveyed through the telephone network 110 and can be received by the telephone gateway 115. The telephone gateway 115, having performed any appropriate data conversions, can convey call information to the resource connector 120. For example, call information can be conveyed using a session initiation protocol (SIP). In particular embodiments, the telephone gateway 115 can also convert circuit-switched data to packet-switched data for processing by the media converter 125 and the voice server 150. In other embodiments, the resource connector 120 can convert circuit-switched data to packet-switched data as appropriate. The resource connector 120 can generate a CDO that contains call related information, including the port(s) that telephone gateway 115 has assigned to the call. In one embodiment, the CDO can be a Java object and the assigned port(s) can include Reliable Data Protocol (RDP) port(s).

Once generated, the CDO can be sent to the media converter 125, which can establish one or more media ports 122 that can be used for the call. Identifiers, which can be Uniform Resource Identifiers (URI), associated with the established media ports 122 can be added to the CDO. The CDO can then be conveyed to voice server components 155 as appropriate for conducting the operations of the voice server 150. The voice server components 155 can determine that one or more work units need processing by a speech engine 130. For each work unit, an appropriate speech engine 130 can be selected. The CDO can be conveyed to the speech engine 130.

The speech engine 130 can connect to the media converter 125 via the media port 122 identified within the CDO. The speech engine 130 can then be conveyed appropriate input signals over the established connection. The speech engine 130 can process the work unit and convey work unit results back to the media converter 125 over the established connection. After the speech engine 130 has handled the work unit, the connection with the media converter 125 can be terminated so that other speech engines 130 can utilize the open media port 122 for conveying data relating to other work units.

Accordingly, the present invention can establish a call-based communication path between the media converter 125 and the speech engines 130. That is, the media ports established for the call by the media converter 125 remain available to the various speech engines 130 throughout the duration of the call. Consequently, the speech engines 130 need not dynamically establish new communication sockets as work units are processed, nor do the speech engines 130 need to communicate socket establishment port information to the media converter 125. Thus, the numerous bottlenecks and latencies present when speech engines dynamically establish sockets on a work unit basis are not present within system 100.

Figure 2:
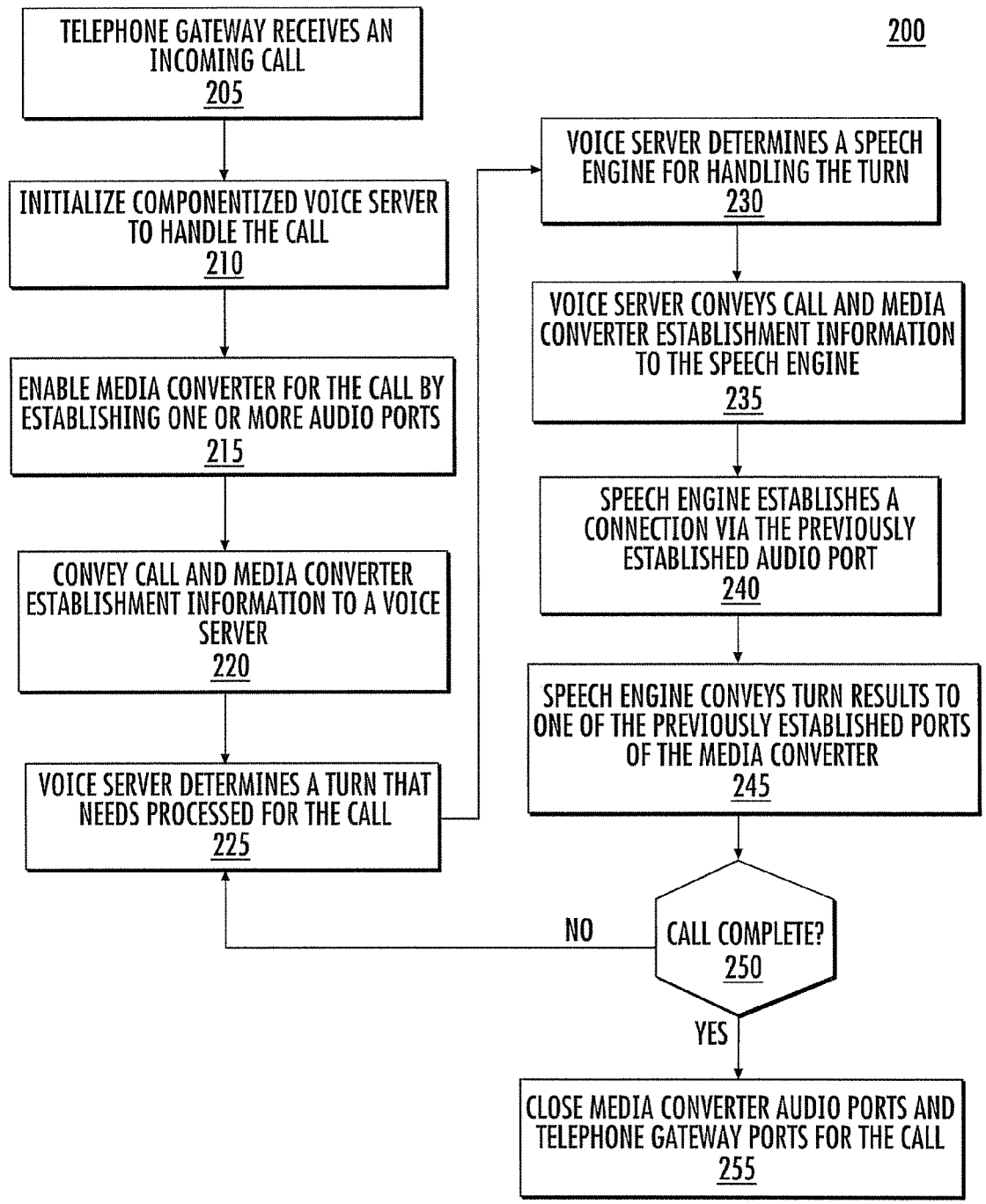
FIG. 2 is a method for implementing telecommunication speech services in accordance with the inventive arrangements disclosed herein.

FIG. 2 is a method 200 for implementing telecommunication speech services in accordance with the inventive arrangements disclosed herein. The method 200 can be performed in the context of a voice server having a componentized and functionally isolated architecture. One of these components can be a telecommunications and media interface component that functions as a media converter. The method can begin in step 205, where a telephone gateway can receive an incoming call. In step 210, a componentized voice server can be initialized to handle the call. In step 215, a media converter, which is a component of the voice server, can establish one or more audio ports for the call. In step 220, call and media converter information can be conveyed to other components of the voice server as needed. For example, a Uniform Resource Identifier (URI) that identifies the audio ports established by the media converter can be included within a software object that is conveyed between voice server components. In such an example, additional call information, such as telephony gateway ports, calling and called telephone numbers, call identifying data, and the like can be included within the conveyed software object.

In step 225, the voice server can determine that a turn needs processed for the call. The turn is a designated work unit that is typically based upon a speech utterance text segment that is to be converted into a speech utterance. In step 230, the voice server can determine a speech engine for handling the turn. In step 235, the voice server can convey call and media converter information to the selected speech engine. In step 240, the speech engine can establish a connection via the previously established audio port. In step 245, the speech engine can convey turn results to one of the previously established ports of the media converter. In step 250, a determination can be made as to whether the call is complete. If so, the method can loop back to step 225, where the voice server can determine that another turn needs processing. If the call is complete, the method can proceed to step 255, where the media converter can close the established audio ports. The telephone gateway can also close the ports that it established for the call. That is, the audio and gateway ports can be closed responsive to call completion. Thus, by establishing call-based sockets when a call is established, latencies typical of speech engines that function as socket servers can be eliminated or at least considerably reduced.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A system for establishing call-based audio sockets within a componentized voice server for communicating with external speech engines, the system comprising:

hardware means for receiving a call via a telephone gateway;

means for initializing the voice server to handle the call;

means for establishing at least one audio socket in a media converting component of the voice server for interfacing the voice server with an external speech engine, the at least one audio socket remaining available for approximately a duration of the call;

means for detecting a work unit of said call that requires processing by an external speech engine;

means for conveying an identifier for the at least one audio socket and data relating to the work unit to a selected external speech engine; and means for receiving work unit results from the selected external speech engine via the at least one audio socket.

2. The system of claim 1, wherein said external speech engine communicates to said telephone gateway using said media converting component as an intermediary, and wherein said external speech engine connects to said telephone gateway via audio sockets established by the media converting component, said established audio sockets being associated with selected telephone calls, and wherein said audio sockets remain available for approximately the duration of the associated telephone call.

3. The system of claim 2, wherein different external speech engines convey work unit results via a single one of said audio sockets during a telephone call for which the audio socket was established.

4. A machine-readable storage having stored thereon a computer program having a plurality of code sections, said code sections executable by a machine for causing the machine to perform the steps of:
receiving a call;
initializing a voice server to handle the call;
establishing at least one audio socket in a media converting component of the voice server for interfacing the voice server with an external speech engine, said at least one audio socket remaining available for approximately a duration of the call;
detecting a work unit of said call that requires processing by an external speech engine;
conveying an identifier for the audio socket and data relating to the work unit to a selected external speech engine; and
receiving work unit results from the selected external speech engine via the at least one audio socket.

5. The machine-readable storage of claim 4, further comprising the steps of:
after the work unit data is processed, the external speech engine initializing a communication connection with the audio socket; and
responsive to said initialization, conveying pending audio signals from the media converting component to the audio socket.

6. The machine-readable storage of claim 4, further comprising the steps of:
detecting a different work unit of said call that requires processing by a speech engine;
conveying said identifier for the audio socket and conveying data relating to the different work unit to a different external speech engine; and
receiving work unit results from said different external speech engine via the same audio socket.

7. The machine-readable storage of claim 6, wherein said external speech engine is an automatic speech recognition engine and wherein said different external speech engine is a text-to-speech engine.

8. The machine-readable storage of claim 4, wherein said at least one audio socket is a plurality of audio sockets.

9. The machine-readable storage of claim 8, wherein said plurality of audio sockets comprises at least one input audio socket and at least one output audio socket.

10. The machine-readable storage of claim 4, wherein said voice server has a componentized architecture of different modular components, wherein each component within said architecture is configured to handle tasks in a functionally isolated fashion from other components of said architecture.

11. A system for establishing call-based audio sockets within a voice server for communicating with speech engines, the system comprising:
at least one input for receiving a call from a telephone gateway; and
at least one computer capable of processing the call received from the at least one input, the at least one computer configured to implement:
initializing the voice server to handle the call;
establishing at least one audio socket in a media converting component of the voice server for interfacing the voice server with at least one speech engine, the at least one audio socket remaining available for approximately a duration of the call;
detecting a work unit of the call that requires processing by a speech engine from the at least one speech engine;
conveying an identifier for the at least one audio socket and data relating to the work unit to the speech engine; and
receiving work unit results from the speech engine via the at least one audio socket.

12. The system of claim 11, wherein:
the speech engine communicates with the telephone gateway using the media converting component as an intermediary,
the speech engine connects to the telephone gateway via audio sockets established by the media converting component, the established audio sockets being associated with selected telephone calls, and
the audio sockets remain available for approximately the duration of the associated telephone call.

13. The system of claim 12, wherein different speech engines convey work unit results via one audio socket of the audio sockets during a telephone call for which the audio socket was established.

* * * * *